United States Patent
Gao et al.

(10) Patent No.: US 11,314,830 B2
(45) Date of Patent: Apr. 26, 2022

(54) METHOD AND APPARATUS FOR AUTOMATICALLY DISCOVERING GAS STATION POI, STORAGE MEDIUM AND DEVICE

(71) Applicant: Baidu Online Network Technology (Beijing) Co., Ltd., Beijing (CN)

(72) Inventors: Long Gao, Beijing (CN); Shangwei Jiao, Beijing (CN); Yu Zhi, Beijing (CN); Wu Yang, Beijing (CN); Guanyang Cai, Beijing (CN); Xin Zhang, Beijing (CN); Zenggang Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 523 days.

(21) Appl. No.: 15/765,231

(22) PCT Filed: Dec. 16, 2015

(86) PCT No.: PCT/CN2015/097573
§ 371 (c)(1),
(2) Date: Mar. 30, 2018

(87) PCT Pub. No.: WO2017/054326
PCT Pub. Date: Apr. 6, 2017

(65) Prior Publication Data
US 2018/0285371 A1    Oct. 4, 2018

(30) Foreign Application Priority Data
Sep. 30, 2015    (CN) .......................... 201510642160.0

(51) Int. Cl.
*G06F 16/00* (2019.01)
*G06F 16/9537* (2019.01)
(Continued)

(52) U.S. Cl.
CPC ........ *G06F 16/9537* (2019.01); *G06F 16/287* (2019.01); *G06F 16/29* (2019.01);
(Continued)

(58) Field of Classification Search
CPC ..... G06F 16/29; G06F 16/9537; G06F 16/358
See application file for complete search history.

(56) References Cited

U.S. PATENT DOCUMENTS

| | | |
|---|---|---|
| 2002/0165661 A1 | 11/2002 | Horikami |
| 2009/0088964 A1* | 4/2009 | Schaaf ................ G06F 3/04842 701/532 |

(Continued)

FOREIGN PATENT DOCUMENTS

| | | |
|---|---|---|
| CN | 102037324 | 4/2011 |
| CN | 103177189 A | 6/2013 |

(Continued)

OTHER PUBLICATIONS

WillHaben, Geo Clustering 3,000,000 Points on the Fly: A Brief How To, Jul. 21, 2015 (Year: 2015).*

(Continued)

*Primary Examiner* — Thu Nguyet T Le
(74) *Attorney, Agent, or Firm* — Knobbe, Martens, Olson & Bear, LLP (57) ABSTRACT

Embodiments of the present disclosure disclose a method and apparatus for automatically discovering a gas station point of interest (POI), a storage medium and a device, wherein, the method includes: collecting information uploaded by an on-board diagnostic (OBD) device, and determining gasoline quantity surge points based on the information; clustering the gasoline quantity surge points based on location information by using a clustering algorithm; and determining a location region having the gas station POI based on a result of clustering. The technical (Continued)

schemes provided by the embodiments of the present disclosure are capable of automatically determining the location region having the gas station POI, thereby reducing collection cost of gas station POI information and shortening an updating period for gas station POIs.

11 Claims, 3 Drawing Sheets

(51) Int. Cl.
 *G06F 16/29* (2019.01)
 *G06F 16/28* (2019.01)
 *G06F 16/9535* (2019.01)
 *G06Q 10/10* (2012.01)
 *G06Q 50/06* (2012.01)
(52) U.S. Cl.
 CPC ......... *G06F 16/9535* (2019.01); *G06Q 10/10* (2013.01); *G06Q 50/06* (2013.01)

(56) References Cited

U.S. PATENT DOCUMENTS

| | | |
|---|---|---|
| 2010/0114478 A1 | 5/2010 | Bai |
| 2013/0253810 A1* | 9/2013 | Miyajima ............ G08G 1/0133 701/118 |
| 2013/0344888 A1* | 12/2013 | Dousse ................ H04W 4/029 455/456.1 |
| 2015/0080023 A1 | 3/2015 | Yang et al. |
| 2016/0321351 A1* | 11/2016 | Mor ........................ G06F 16/29 |

FOREIGN PATENT DOCUMENTS

| | | |
|---|---|---|
| CN | 103678559 A | 3/2014 |
| CN | 103853740 A | 6/2014 |
| JP | 2002-062156 A | 2/2002 |
| JP | 2015-057695 A | 3/2015 |
| KR | 10-2006-0127661 A | 12/2006 |
| WO | WO 2012/147125 A1 | 7/2014 |

OTHER PUBLICATIONS

Korean Office Action dated May 2, 2019 for Korean Patent Application No. KR 10-2018-7012263, which cites the above-identified references numbered 3-6, and which shares priority of Chinese Patent Application No. CN 201510642160.0 with subject U.S. Appl. No. 15/765,231.

Kajimura, et al., "Quality Control for Crowdsourced POI Collection," The University of Tokyo, Tokyo, Japan, Springer International Publishing Switzerland 2015, PAKDD 2015, Part II, LNAI 9078, pp. 255-267, 2015.

International Search Report dated Jun. 28, 2016 for International Application No. PCT/CN2015/097573, 6 pages.

Written Opinion of the International Searching Authority dated Jun. 28, 2016 for International Application No. PCT/CN2015/097573, 3 pages.

基于车辆自感知的 应用与关键技术研 究 University of Electronic Science and Technology of China, Doctoral Dissertation, Oct. 6, 2008, 119 pages.

城市热点挖掘系统 的研究与实现 Research and Implementation on Knowledge Discovery of Urban Hot Spot). 66 pages, Feb. 2014.

* cited by examiner

METHOD AND APPARATUS FOR AUTOMATICALLY DISCOVERING GAS STATION POI, STORAGE MEDIUM AND DEVICE

CROSS-REFERENCE TO RELATED APPLICATION

The present patent application is the U.S. National Phase Application under 35 U.S.C. § 371 of International Application No. PCT/CN2015/097573, filed Dec. 16, 2015, designating the U.S. and published as WO 2017/054326 A1 on Apr. 6, 2017 which claims the priority of Chinese Patent Application No. 201510642160.0 by Baidu Online Network Technology (Beijing) Co., Ltd, filed on Sep. 30, 2015, and entitled "Method and Apparatus for Automatically Discovering Gas Station POI," the content of each of which is incorporated herein by reference.

TECHNICAL FIELD

Embodiments of the present disclosure relate to the technical field of searching, in particular to a method and apparatus for automatically discovering a gas station POI, a storage medium and a device.

BACKGROUND

In the existing technology, collection methods of gas station points of interest (POIs) primarily implement manual collection by utilizing on foot collection, in vehicle collection and aerial photographic methods.

In the above schemes, for both on foot collection and in vehicle collection, specific locations of gas stations are unknown in advance, which are necessarily only discovered after a person or a collection vehicle arrived at the relevant locations, so collection cost is relatively high, and there are situations that gas stations are missed. In addition, where a new gas station is established or a gas station is decommissioned, it cannot be promptly discovered by the existing collection methods, but only during the next collection period, thereby resulting in an extended updating period for gas station POIs.

SUMMARY

The objective of the embodiments of the present disclosure is to provide a method and apparatus for automatically discovering a gas station POI, a storage medium and a device so as to solve the problems of a relatively high collection cost and an extended updating period for gas station POIs.

In a first aspect, the embodiments of the present disclosure provide a method for automatically discovering a gas station POI, comprising:

collecting information uploaded by an on-board diagnostic (OBD) device, and determining gasoline quantity surge points based on the information;

clustering the gasoline quantity surge points based on location information by using a clustering algorithm; and determining a location region having the gas station POI based on a result of clustering.

In a second aspect, the embodiments of the present disclosure provide an apparatus for automatically discovering a gas station POI, comprising:

a gasoline quantity surge point determining module configured to collect information uploaded by an OBD device, and determining gasoline quantity surge points based on the information;

a clustering processing module configured to cluster the gasoline quantity surge points based on location information by using a clustering algorithm; and a location determining module configured to determine a location region having the gas station POI based on a result of clustering.

In a third aspect, the embodiments of the present disclosure provide a non-volatile computer storage medium storing one or more modules, wherein when the one or more modules are executed by a device performing a method for automatically discovering a gas station POI, the device performs the following operations:

collecting information uploaded by an OBD device, and determining gasoline quantity surge points based on the information;

clustering the gasoline quantity surge points based on location information by using a clustering algorithm; and determining a location region having the gas station POI based on a result of clustering.

In a fourth aspect, the embodiments of the present disclosure provide an apparatus, including:

one or more processors;

a memory; and one or more programs stored in the memory, wherein when the one or more programs are executed by the one or more processors, following operations are performed:

collecting information uploaded by an OBD device, and determining gasoline quantity surge points based on the information;

clustering the gasoline quantity surge points based on location information by using a clustering algorithm; and determining a location region having the gas station POI based on a result of clustering.

The method and apparatus for automatically discovering the gas station POI, the storage medium and the device provided by the embodiments of the present disclosure are capable of determining gasoline quantity surge points through processing the relevant information based on the relevant information uploaded by an OBD device, clustering relevant points of a processing result by using a clustering algorithm and automatically determining a location region having the gas station POI. It is not necessary for a person or a collection vehicle to come to the corresponding locations to discover the gas station POIs, thereby reducing the collection cost of gas station POI information and shortening the updating period for gas station POIs.

BRIEF DESCRIPTION OF THE DRAWINGS

To more clearly describe the technical solutions provided by the embodiments of the present disclosure, drawings used in the description of the embodiments will be briefly introduced below. Of course, the drawings described below are merely some embodiments of the present disclosure. To a person of ordinary skill in the art, modifications and substitutions may be made to these drawings without creative efforts.

DETAILED DESCRIPTION OF EMBODIMENTS

The technical solution provided by the embodiments of the present disclosure will be clearly and completely described below with reference to the accompanying drawings. Clearly, the described embodiments are some, rather than all of the embodiments of the present disclosure, and intended to illustrate the principles of the present disclosure, rather than limit the present disclosure to these specific embodiments. All other embodiments obtained by those skilled in the art, without creative effort and on the basis of the embodiments in the present disclosure, are within the scope of the present disclosure.

First Embodiment

Figure 1:
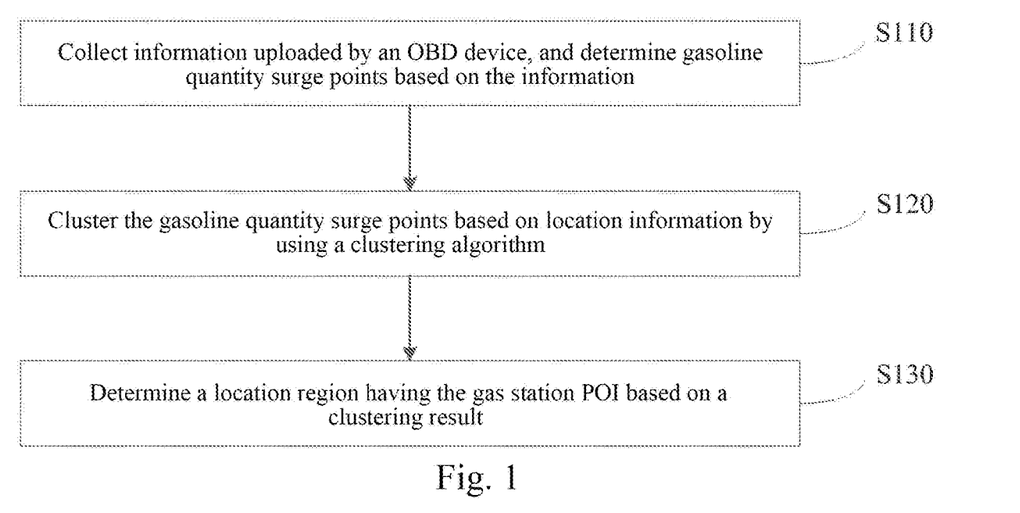
FIG. 1 is a flowchart of a method for automatically discovering a gas station POI provided by a first embodiment of the present disclosure.

FIG. 1 is a flowchart of a method for automatically discovering a gas station POI provided by a first embodiment of the present disclosure. This embodiment may be applied under a condition that gas station POIs are collected. This method may be executed by an apparatus for automatically discovering the gas station POI, and the device is implemented by software and/or hardware. Referring to FIG. 1, a method for automatically discovering a gas station POI provided by the embodiment of the present disclosure specifically includes the following operations:

S110, collecting information uploaded by an OBD device, and determining gasoline quantity surge points based on the information.

The OBD device is installed on an automobile, can be used for monitoring an operating state of the automobile, and is capable of inspecting a plurality of systems and components on the automobile in real time and determining whether the automobile is in a malfunction state. The information uploaded by the OBD device includes the location, speed, residual gasoline quantity, instant gasoline consumption, tire pressure, and water temperature of the automobile etc. The points of gasoline quantity surge are gasoline quantity surge points corresponding to the OBD devices, and are abstract points of these automobiles having the OBD devices. If the speed, gasoline quantity and other information of the automobile uploaded by the OBD device meet certain conditions, this OBD device is at a gasoline quantity surge point.

S120, clustering the gasoline quantity surge points based on location information by using a clustering algorithm.

The location information is location information of the automobile uploaded by the OBD device corresponding to the gasoline quantity surge point, including the longitude and latitude information of the automobile location.

After the gasoline quantity surge points are clustered based on the location information such as the longitude and latitude by using the clustering algorithm. A geographic area may be divided into a plurality of regions. Gasoline quantity surge points having close proximities are clustered into one class, the gasoline quantity surge points in the same class share a location region. Here, the clustering algorithm may be a geo HASH algorithm.

S130, determining a location region having the gas station POI based on a result of clustering.

The technical scheme provided by this embodiment is capable of determining the gasoline quantity surge points through processing the relevant information based on the relevant information uploaded by the OBD device, then clustering the processed results by using the clustering algorithm, and automatically determining the location region having the gas station POI, thereby reducing the collection cost of the gas station POIs and shortening the updating period for the gas station POIs.

Second Embodiment

Figure 2:
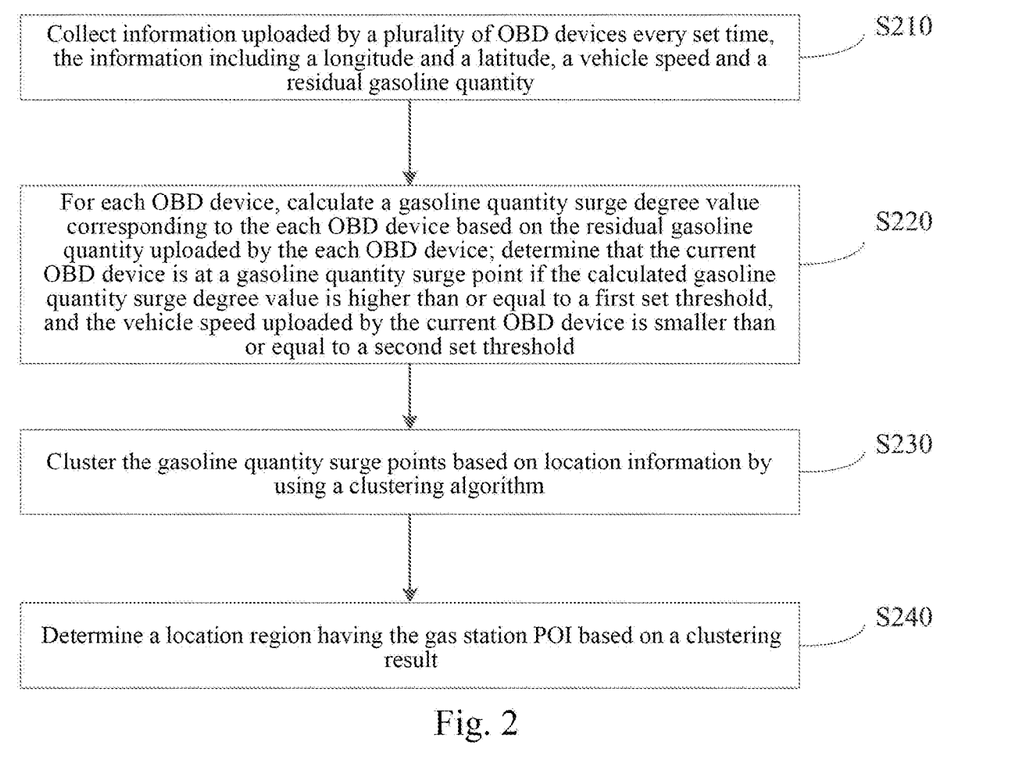
FIG. 2 is a flowchart of a method for automatically discovering a gas station POI provided by a second embodiment of the present disclosure.

FIG. 2 is a flowchart of a method for automatically discovering a gas station POI provided by the second embodiment of the present disclosure. This embodiment is obtained by optimizing the operation S110 on the basis of the first embodiment. As shown in FIG. 2, this method includes the following specific flows:

S210, collecting information uploaded by a plurality of OBD devices every set time, the information including a vehicle and a residual gasoline quantity.

S220, for each OBD device, calculating a gasoline quantity surge degree value corresponding to the each OBD device based on the residual gasoline quantity uploaded by the each OBD device; determining that the current OBD device is at a gasoline quantity surge point if the calculated gasoline quantity surge degree value is higher than or equal to a first set threshold and the vehicle speed uploaded by the current OBD device is smaller than or equal to a second set threshold.

Considering that an engine of the automobile goes out when the automobile is filled with gasoline, and the vehicle speed of the automobile is generally zero or close to zero, so whether the automobile is filled with gasoline near a gas station may be determined based on the two conditions. Generally, the gasoline filling time of the automobile is from a few seconds to a few minutes, and thus vehicle speeds, residual gasoline quantities and other information uploaded by the plurality of OBD devices may be collected every certain set time. Then, for each OBD device, the gasoline quantity surge degree value corresponding to the present OBD device is calculated based on the residual gasoline quantity information uploaded by the present OBD device. Optionally, the gasoline quantity surge degree value may be calculated by using the following formula:

$$W=\text{MAX}\{O_n-O_1, O_{n-1}-O_1, \Lambda, O_3-O_1, O_2-O_1\}/(O_1+1)$$

wherein, W represents the gasoline quantity surge degree value, n represents the set time in seconds, and $O_1$ to $O_n$ respectively represent the residual gasoline quantity at every second within current n seconds.

Exemplarily, when the set time is 5 s, namely, information such as a longitude, a latitude and a vehicle speed uploaded by the OBD device is collected once every 5 s, this information includes information within the continuous 5 seconds, the gasoline quantity surge value is calculated based on the following formula: $W=\text{MAX}\{O_5-O_1, O_4-O_1, O_3-O_1, O_2-O_1\}/(O_1+1)$; $O_1$ to $O_5$ are residual gasoline quantities from the first second to the fifth second within the continuous 5 seconds. The gasoline quantity surge value may be precisely calculated through this calculation method.

Preferably, if the calculated gasoline quantity surge degree value is higher than or equal to 1.59 and the current vehicle speed is 0, it is determined that the current OBD device is at the gasoline quantity surge point.

Since the time periods set for collecting information uploaded by the OBD device are different, and the gasoline quantity of the automobile is gradually increased in the process of filling gasoline, the degree of gasoline quantity surge is related to a gasoline filling time and a gasoline filling rate. In addition, in the process of filling the gasoline, the speed of the automobile is not necessarily zero. Factors such as whether the grounds of regions where gas stations are located are flat, or wind speeds near the gas stations, may influence the collected current speed of the automobile. Accordingly, the first set threshold and the second set threshold may be flexibly set according to the actual demand, for example, the first set threshold may be set as other numerical values larger than zero, and the second set threshold may be set as a numerical value larger than 0 but close to 0.

S230, clustering the gasoline quantity surge points based on location information by using the clustering algorithm.

The location information is location information of the automobile uploaded by the OBD device corresponding to the gasoline quantity surge point, including the longitude and latitude information of the automobile.

S240, determining a location region having the gas station POI based on a result of clustering.

The technical scheme provided by this embodiment is capable of precisely determining the gasoline quantity surge points by using a relevant algorithm and principle, clustering relevant points of the processing results by using the clustering algorithm and automatically determining the location region having the gas station POI. It is not necessary for a person or a collection vehicle to come to the corresponding locations to discover the gas station POIs, thereby reducing the collection cost of gas station POI information and shortening the updating period for the gas station POIs.

Third Embodiment

This embodiment is optimized on the basis of the embodiments described above. In the embodiments described above, the information uploaded by the OBD device includes the longitude and latitude information, namely, the location information of the automobile uploaded by the OBD device may be the longitude and latitude information. The clustering algorithm may be a geo HASH algorithm, and the location information My be longitude and latitude information.

Determining a location region having the gas station POI based on a result of clustering includes:

determining whether the gas station POI exists in the geo HASH grid based on a number of points inside the geo HASH grid generated after clustering;

further, determining that the gas station POI exists in the geo HASH grid if the number of the points inside the geo HASH grid reaches a third set threshold, otherwise, determining that the gas station POI does not exist in the geo HASH grid; and determining a region defined by a longitude and a latitude represented by the geo HASH grid as the location region having the gas station POI if the gas station POI exists in the geo HASH grid.

A process of clustering the gasoline quantity surge points based on the location information by using a geo HASH algorithm includes: respectively setting a geo HASH character string, which identifies a location of a corresponding gasoline quantity surge point, for each gasoline quantity surge point code based on the longitude and latitude information uploaded by the OBD devices corresponding to various gasoline quantity surge points, and then clustering various gasoline quantity surge points by using the geo HASH algorithm based on geo HASH character strings of various gasoline quantity surge points.

Exemplarily, a longitude and a latitude of one gasoline quantity surge point are respectively set as 116.389550 and 39.928167, and a process of performing geo HASH encoding on the longitude and the latitude is as follows:

a latitude interval of the earth is [−90,90], and approximation encoding is performed on the latitude 39.928167 through the following algorithm:

(1) the interval [−90,90] is divided into [−90,0] and [0,90], designated as left and right intervals respectively, it may be determined that 39.928167 belongs to the right interval [0,90] and labelled as 1;

(2) subsequently, the interval [0,90] is further divided into [0,45] and [45,90], and it may be determined that 39.928167 belongs to the left interval [0,45] and is labelled as 0;

(3) the above processes are repeated, 39.928167 always belongs to an interval [a, b]. Along with each iteration, the interval [a, b] is successively narrowed, and is increasingly approximate to 39.928167; and (4) if a given latitude×(39.928167) belongs to the left interval, it is labelled as 0, and if the given latitude× (39.928167) belongs to the right interval, it is labelled as 1.

In such a way, a sequence 1011100 is generated as the algorithm is performed, a length of the sequence is related to the number of divisions of the given interval, and a process of obtaining codes based on the latitude is shown in the below table.

| Left end point of an interval | Middle value of an interval | Right end point of an interval | Code bit |
| --- | --- | --- | --- |
| −90.000 | 0.000 | 90.000 | 1 |
| 0.000 | 45.000 | 90.000 | 0 |
| 0.000 | 22.500 | 45.000 | 1 |
| 22.500 | 33.750 | 45.000 | 1 |
| 33.750 | 39.375 | 45.000 | 1 |
| 39.375 | 42.188 | 45.000 | 0 |
| 39.375 | 40.7815 | 42.188 | 0 |
| 39.375 | 40.07825 | 40.7815 | 0 |
| 39.375 | 39.726625 | 40.07825 | 1 |
| 39.726625 | 39.9024375 | 40.07825 | 1 |

A code generated by the latitude is 10111 00011. Similarly, a longitude interval of the earth is [−180,180], a code obtained by encoding the longitude 116.389550 is 11010 01011. Placing the longitude in the even bits and the latitude in the odd bits to combine them into a new code 11100 11101 00100 01111. Then, the code is converted into a decimal number, since a 5-bit code corresponds to one decimal number having a converted decimal range of 0-31. The decimal figures corresponding to the above codes are 28, 29, 4 and 15. Lastly, based on the corresponding relationship in the following table, the decimal figures are converted to character strings, namely, HASH character strings, in this example, the length of the used HASH character string is 4, and a character string corresponding to the longitude and the latitude is W54G.

| Decimal system | | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| BASE32 | 0 | 1 | 2 | 3 | 4 | 5 | 6 | 7 | 8 | 9 | B | C | D | E | F | G |

| Decimal system | | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| BASE32 | H | J | K | M | N | P | Q | R | S | T | U | V | W | X | Y | Z |

Figure 3:
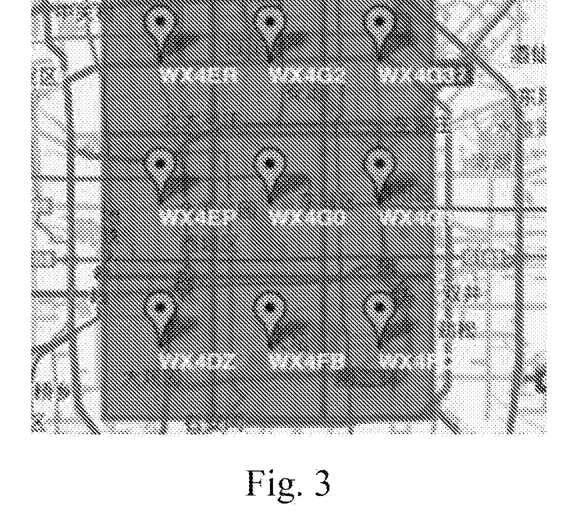
FIG. 3 is a schematic diagram of a geo HASH character string identification location region provided by a third embodiment of the present disclosure.

As shown in FIG. 3, FIG. 3 illustrates geo HASH character strings corresponding to 9 regions, each character string corresponds to one rectangular region, that is to say, all of the points (longitude and latitude coordinates) in this rectangular region share the same geo character string.

Each HASH character string corresponds to one HASH grid. After clustering, in the same HASH grid, namely, when the number of the points inside the same rectangular region reaches the third set threshold, it is determined that the region corresponding to this HASH grid has the gas station POI. The third set threshold is related to the actual number of automobiles filling gasoline in the region where a gas station is located. In some remote areas, the number of the automobiles filling gasoline at some gas stations may be relatively few, and the number of the points calculated inside the HASH grid may also be relatively few. Thus, different third thresholds, which may be any arbitrary numerical values greater than zero, are set according to an actual demand or with respect to different location regions.

Preferably, when the number of the points inside the geo HASH grid reaches 21.5, it is considered that a region defined by the longitude and the latitude represented by this geo HASH grid has the gas station POI.

Preferably, when the gasoline quantity surge points are clustered based on location information by using the geo HASH algorithm, the length of an adopted geo HASH character string is 7.

When clustering is performed by using the geo HASH algorithm, the longer the length of the adopted geo HASH character string is, the smaller a deviation of the finally determined region having the gas station POI is. A corresponding relationship between the length of the geo HASH character string and the deviation of the final result of clustering is shown in the below table. In order to consider both of precision and granularity of the collected gas station POIs, the length of the geo HASH character string is selected as 7. Of course, other values may also be used as the length of the character string.

| Length of geo HASH character string | Longitude deviation | Latitude deviation | Range deviation (Km) |
|---|---|---|---|
| 1 | 23 | 23 | 2500 |
| 2 | 2.8 | 5.6 | 630 |
| 3 | 0.7 | 0.7 | 78 |
| 4 | 0.087 | 0.18 | 20 |
| 5 | 0.022 | 0.022 | 2.4 |
| 6 | 0.0027 | 0.0055 | 0.61 |
| 7 | 0.00068 | 0.00068 | 0.076 |
| 8 | 0.000085 | 0.00017 | 0.019 |

The technical scheme provided by this embodiment is capable of precisely determining whether the region has the gas station POI through performing geo HASH clustering processing on the gasoline quantity surge points, so that the collection cost of the gas station POIs is reduced, and a POI updating speed is relatively fast.

Fourth Embodiment

Figure 4:
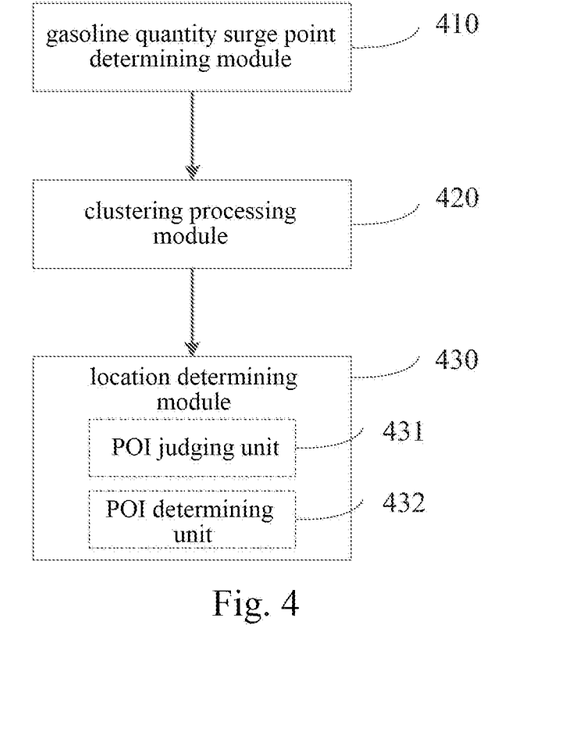
FIG. 4 is a schematic structural diagram of an apparatus for automatically discovering a gas station POI provided by a fourth embodiment of the present disclosure.

FIG. 4 is a schematic structural diagram of an apparatus for automatically discovering a gas station POI provided by the embodiment 4 of the present disclosure. Referring to FIG. 4, a specific structure of the apparatus for automatically discovering the gas station POI is as follows:

a gasoline quantity surge point determining module 410 configured to collect information uploaded by an OBD device, and determine gasoline quantity surge points based on the information;

a clustering processing module 420 configured to cluster the gasoline quantity surge points based on location information by using a clustering algorithm; and a location determining module 430 configured to determine a location region having the gas station POI based on a result of clustering.

Wherein, the gasoline quantity surge point determining module 410 is specifically configured to:

collect information uploaded by a plurality of OBD devices every set time, the information including a vehicle speed and a residual gasoline quantity; and for each OBD device, calculate a gasoline quantity surge degree value corresponding to the each OBD device based on the residual gasoline quantity uploaded by the each OBD device; determine that the current OBD device is a gasoline quantity surge point if the calculated gasoline quantity surge degree value is higher than or equal to a first set threshold and the vehicle speed uploaded by the current OBD device is smaller than or equal to a second set threshold.

Preferably, the gasoline quantity surge degree value may be calculated by using the following formula:

$$W = \text{MAX}\{O_n - O_1, O_{n-1} - O_1, \Lambda, O_3 - O_1, O_2 - O_1\}/(O_1 + 1)$$

wherein, W represents the gasoline quantity surge degree value, n represents the set time in seconds, and $O_1$ to $O_n$ respectively represent the residual gasoline quantity at every second within current n seconds.

Further, information uploaded by the OBD device includes longitude and latitude information, the clustering algorithm is a geo HASH algorithm, and the location information is the longitude and latitude information.

The location determining module 430 includes:

a POI judging unit 431 configured to determine whether a gas station POI exists in a geo HASH grid based on a number of points inside the geo HASH grid generated after clustering;

further, the POI judging unit 431 is specifically configured to:

determine that the gas station POI exists in the geo HASH grid if the number of the points inside the geo HASH grid reaches a third set threshold, otherwise, determine that the gas station POI does not exist in the geo HASH grid.

A POI determining unit 432 is configured to determine a region defined by a longitude and a latitude represented by the geo HASH grid as a location region having the gas station POI when the POI judging unit determines that the gas station POI exists in the geo HASH grid.

Preferably, when the clustering processing module 420 performs clustering on the gasoline quantity surge points based on location information by using the geo HASH algorithm, the length of an adopted geo HASH character string is 7.

The above apparatus may perform the methods for automatically discovering the gas station POI provided by any embodiments of the present disclosure, and has functional modules performing the corresponding methods and beneficial effects.

Fifth Embodiment

This embodiment provides a non-volatile computer storage medium storing one or more modules, the one or more modules when executed by a device for executing a method for automatically discovering a gas station POI, causing the device to execute the following operations:

collecting information uploaded by an on-board diagnostic (OBD) device, and determining gasoline quantity surge points based on the information;

clustering the gasoline quantity surge points based on location information by using a clustering algorithm; and determining a location region having the gas station POI based on a result of clustering.

When the one or more modules stored in the above-mentioned storage medium are executed by the device, the collecting information uploaded by an OBD device, and determining gasoline quantity surge points based on the information further comprises:

collecting the information uploaded by a plurality of OBD devices every set time, the information comprising a vehicle speed and a residual gasoline quantity; and for each OBD device, calculating a gasoline quantity surge degree value corresponding to the each OBD device based on the residual gasoline quantity uploaded by the each OBD device; determining that the current OBD device is at a gasoline quantity surge point if the calculated gasoline quantity surge degree value is higher than or equal to a first set threshold and the vehicle speed uploaded by the current OBD device is smaller than or equal to a second set threshold.

When the one or more modules stored in the above-mentioned storage medium are executed by the device, the gasoline quantity surge degree value is calculated by using the following formula:

$$W=\mathrm{MAX}\{O_n-O_1, O_{n-1}-O_1, \Lambda, O_3-O_1, O_2-O_1\}/(O_1+1);$$

wherein, W represents the gasoline quantity surge degree value, n represents the set time in seconds, and $O_1$ to $O_n$ respectively represent the residual gasoline quantity at every second within current n seconds.

When the one or more modules stored in the above-mentioned storage medium are executed by the device, the information uploaded by the OBD device comprises longitude and latitude information, the clustering algorithm is a geo HASH algorithm, and the location information is the longitude and latitude information.

When the one or more modules stored in the above-mentioned storage medium are executed by the device, the determining a location region having the gas station POI based on a result of clustering comprises:

determining whether the gas station POI exists in a geo HASH grid based on a number of points inside the geo HASH grid generated after clustering; and determining a region defined by a longitude and a latitude represented by the geo HASH grid as the location region having the gas station POI if the gas station POI exists in the geo HASH grid.

When the one or more modules stored in the above-mentioned storage medium are executed by the device, the determining whether the gas station POI exists in a geo HASH grid based on a number of points inside the geo HASH grid generated after clustering comprises:

determining that the gas station POI exists in the geo HASH grid if the number of the points inside the geo HASH grid reaches a third set threshold, otherwise, determining that the gas station POI does not exist in the geo HASH grid.

When the one or more modules stored in the above-mentioned storage medium are executed by the device, when the gasoline quantity surge points are clustered based on the location information by using the geo HASH algorithm, the length of an adopted geo HASH character string is 7.

Through the description of the foregoing implementations, a person skilled in the art may clearly know that the present disclosure may be implemented by means of software and necessary general hardware or of course by means of hardware, but in most cases the former is the better implementation manner. Based on such an understanding, the technical solutions of the present disclosure in essence or that part of contribution to the prior art may be embodied in the form of software products, which may be stored in computer-readable storage media, such as floppy disk, read-only memory (ROM), random access memory (RAM), Flash, hard disk or optical disk of a computer, including some instructions so that a computer device (a personal computer, a server, or a network device, etc.) is caused to perform the methods as recited in each embodiment of the present disclosure.

Sixth Embodiment

Figure 5:
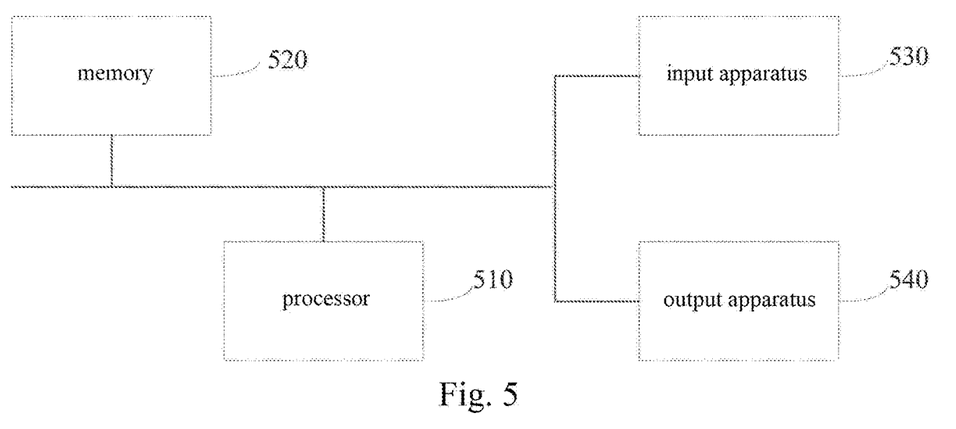
FIG. 5 is a schematic diagram of a hardware structure of an apparatus performing a method for automatically discovering a gas station POI provided by a sixth embodiment of the present disclosure.

FIG. 5 is a schematic diagram of a device hardware structure for executing a method for automatically discovering a gas station POI according to Embodiment 5 of the present disclosure. Referring to FIG. 5, the device comprises:

one or more processors 510, wherein one processor 510 is taken as an example in FIG. 5;

a memory 520; and one or more modules.

The device may further comprise: an input apparatus 530 and an output apparatus 540. The processor 510, the memory 520, the input apparatus 530, and the output apparatus 540 in the device may be connected via a bus or in other modes. Connection by a bus is used as an example in FIG. 5.

As a computer readable storage medium, the memory 520 may be used to store software programs, computer executable programs, and modules, for example, the program instructions/modules corresponding to the method for automatically discovering a gas station POI in the embodiments of the present disclosure (for example, the gasoline quantity surge point determining module 410, the clustering processing module 420, the location determining module 430 in the apparatus for automatically discovering a gas station POI shown in FIG. 4). The processor 510 runs the software programs, instructions and modules stored in the memory 520 to execute various functional applications and data processing, that is, to implement the method for automatically discovering a gas station POI of the above method embodiments.

The memory 520 may include a program storage area and a data storage area. The program storage area may store an operating system and an application required for at least one function. The data storage area may store data and the like created according to the usage of a terminal device. In addition, the memory 520 may include a high-speed random access memory, and may also include a non-volatile memory, e.g., at least one disk storage device, a flash memory device or other non-volatile solid-state storage devices. In some embodiments, the memory 520 may further include memories remotely arranged relative to the processor 510, where the remote memories may be connected to the terminal device by a network. An example of the above network includes but not limited to, the Internet, an enterprise intranet, a local area network, a mobile communications network, and a combination thereof.

The input apparatus 530 may be used for receiving entered digit or character information, and generating a key signal input related to the user setting and function control of the terminal device. The output apparatus 540 may include a display screen and other display devices.

The one or more modules stored in the memory 520, when executed by the one or more processors 510, perform the following operations:

collecting information uploaded by an on-board diagnostic (OBD) device, and determining gasoline quantity surge points based on the information;

clustering the gasoline quantity surge points based on location information by using a clustering algorithm; and determining a location region having the gas station POI based on a result of clustering.

Preferably, the collecting information uploaded by an OBD device, and determining gasoline quantity surge points based on the information comprises:

collecting the information uploaded by a plurality of OBD devices every set time, the information comprising a vehicle speed and a residual gasoline quantity; and for each OBD device, calculating a gasoline quantity surge degree value corresponding to the each OBD device based on the residual gasoline quantity uploaded by the each OBD device; determining that the current OBD device is at a gasoline quantity surge point if the calculated gasoline quantity surge degree value is higher than or equal to a first set threshold and the vehicle speed uploaded by the current OBD device is smaller than or equal to a second set threshold.

Preferably, the gasoline quantity surge degree value is calculated by using the following formula:

$$W = \mathrm{MAX}\{O_n - O_1, O_{n-1} - O_1, \Lambda, O_3 - O_1, O_2 - O_1\}/(O_1 + 1);$$

wherein, W represents the gasoline quantity surge degree value, n represents the set time in seconds, and $O_1$ to $O_n$ respectively represent the residual gasoline quantity at every second within current n seconds.

Preferably, the information uploaded by the OBD device comprises longitude and latitude information, the clustering algorithm is a geo HASH algorithm, and the location information is the longitude and latitude information; and the determining a location region having the gas station POI based on a result of clustering comprises:

determining whether the gas station POI exists in a geo HASH grid based on a number of points inside the geo HASH grid generated after clustering; and determining a region defined by a longitude and a latitude represented by the geo HASH grid as the location region having the gas station POI if the gas station POI exists in the geo HASH grid.

Preferably, the determining whether the gas station POI exists in a geo HASH grid based on a number of points inside the geo HASH grid generated after clustering comprises:

determining that the gas station POI exists in the geo HASH grid if the number of the points inside the geo HASH grid reaches a third set threshold, otherwise, determining that the gas station POI does not exist in the geo HASH grid.

Preferably, when the gasoline quantity surge points are clustered based on the location information by using the geo HASH algorithm, the length of an adopted geo HASH character string is 7.

It should be noted that in the embodiments of the device for automatically discovering a gas station POI described above, the respective units and modules are divided according to the functional logics, but not limited to the above-described division, as long as the corresponding function may be achieved. In addition, the specific name of each of functional units is merely for ease of mutual distinction and is not intended to limit the scope of the present disclosure.

The above descriptions are merely specific implementations of the present disclosure, but the protection scope of the present disclosure is not limited thereto. Any variations or replacements that can be easily conceived of by those skilled in the art within the technical scope disclosed by the present disclosure shall be encompassed by the protection scope of the present disclosure. Therefore, the protection scope of the present disclosure shall be subject to the protection scope of the claims.

What is claimed is:

1. A method for automatically discovering a gas station point of interest (POI), comprising:

acquiring, by a first on-board diagnostic (OBD) device arranged at a first vehicle, first information including a first location of the first vehicle;

acquiring, by a second OBD device arranged at a second vehicle, second information including a second location of the second vehicle;

collecting information including the first information and the second information uploaded by the first OBD device and the second OBD device every set time, and determine gasoline quantity surge points based on the information;

determining, for each gasoline quantity surge point, a geo HASH character string identifying a location of the gasoline quantity surge point based on longitude and latitude information uploaded by the OBD device, and clustering the gasoline quantity surge points by using a geo HASH algorithm based on geo HASH character strings of the gasoline quantity surge points, wherein each of the geo HASH character strings corresponds to a geo HASH grid, the gasoline quantity surge points in the same geo HASH grid share the same geo HASH character string, and the longitude and latitude information corresponds to the gasoline quantity surge point;

determining a region defined by a longitude and a latitude represented by the geo HASH grid comprising a number of gasoline quantity surge points greater than a threshold as the location region having the gas station POI;

wherein the method is performed by at least one processor, and the information comprises a residual gasoline quantity, and determining gasoline quantity surge points based on the information comprises:

for each OBD device, calculating a gasoline quantity surge degree value corresponding to the each OBD device based on the residual gasoline quantity uploaded by the each OBD device; determining that the current OBD device is at a gasoline quantity surge point in response to determining that the calculated gasoline quantity surge degree value is higher than or equal to a first set threshold and the vehicle speed uploaded by the current OBD device is smaller than or equal to a second set threshold;

wherein calculating the gasoline quantity surge degree value includes:

collecting the residual gasoline quantities at every second within the set time;

selecting the maximum value among the residual gasoline quantities; and determining the gasoline quantity surge degree value based on the maximum value of the residual gasoline quantities.

2. The method according to claim 1, wherein the information further comprises a vehicle speed.

3. The method according to claim 1, wherein a length of the geo HASH character string is 7.

4. The method according to claim 1, wherein the region is further defined by a rectangular region, wherein the method further comprises determining whether the number of gasoline quantity surge points inside the rectangular region exceeds a threshold; and in response to determining that the number of gasoline quantity surge points inside the rectangular region exceeds a threshold, determining that the rectangular region corresponding to HASH grid includes the gas station POI.

5. The method according to claim 1, wherein the geo HASH character string is determined by encoding the longitude and latitude information corresponds to the gasoline quantity surge point to obtained an encoded result, and converting the encoded result to the HASH character string based on a preset correspondence table.

6. An apparatus for automatically discovering a gas station point of interest (POI), comprising:

at least one processor; and a memory storing instructions, the instructions when executed by the at least one processor, causing the at least one processor to perform operations, the operations comprising:

acquiring, by a first on-board diagnostic (OBD) device arranged at a first vehicle, first information including a first location of the first vehicle;

acquiring, by a second OBD device arranged at a second vehicle, second information including a second location of the second vehicle;

collecting information including the first information and the second information uploaded by the first OBD device and the second OBD device every set time, and determining gasoline quantity surge points based on the information;

determining, for each gasoline quantity surge point, a geo HASH character string identifying a location of the gasoline quantity surge point based on longitude and latitude information uploaded by the OBD device, and clustering the gasoline quantity surge points by using a geo HASH algorithm based on geo HASH character strings of the gasoline quantity surge points, wherein each of the geo HASH character strings corresponds to a geo HASH grid, the gasoline quantity surge points in the same geo HASH grid share the same geo HASH character string, and the longitude and latitude information corresponds to the gasoline quantity surge point;

determining a region defined by a longitude and a latitude represented by the geo HASH grid comprising a number of gasoline quantity surge points greater than a threshold as the location region having the gas station POI, wherein the information comprises a residual gasoline quantity, and determining gasoline quantity surge points based on the information comprises:

for each OBD device, calculating a gasoline quantity surge degree value corresponding to the each OBD device based on the residual gasoline quantity uploaded by the each OBD device; determining that the current OBD device is at a gasoline quantity surge point in response to determining that the calculated gasoline quantity surge degree value is higher than or equal to a first set threshold and the vehicle speed uploaded by the current OBD device is smaller than or equal to a second set threshold;

wherein calculating the gasoline quantity surge degree value includes:

collecting the residual gasoline quantities at every second within the set time;

selecting the maximum value among the residual gasoline quantities; and determining the gasoline quantity surge degree value based on the maximum value of the residual gasoline quantities.

7. The apparatus according to claim 6, wherein the information further comprises a vehicle speed.

8. The apparatus according to claim 6, wherein a length of the geo HASH character string is 7.

9. A non-volatile computer storage medium storing one or more modules, wherein when the one or more modules are executed by a device performing a method for automatically discovering a gas station point of interest (POD, the device executes the following operations:

acquiring, by a first on-board diagnostic (OBD) device arranged at a first vehicle, first information including a first location of the first vehicle;

acquiring, by a second OBD device arranged at a second vehicle, second information including a second location of the second vehicle;

collecting information including the first information and the second information uploaded by the first OBD device and the second OBD device every set time, and determining gasoline quantity surge points based on the information;

determining, for each gasoline quantity surge point, a geo HASH character string identifying a location of the gasoline quantity surge point based on longitude and latitude information uploaded by the OBD device, and clustering the gasoline quantity surge points by using a geo HASH algorithm based on geo HASH character strings of the gasoline quantity surge points, wherein each of the geo HASH character strings corresponds to a geo HASH grid, the gasoline quantity surge points in the same geo HASH grid share the same geo HASH character string, and the longitude and latitude information corresponds to the gasoline quantity surge point;

determining a region defined by a longitude and a latitude represented by the geo HASH grid comprising a number of gasoline quantity surge points greater than a threshold as the location region having the gas station POI, wherein the information comprises a residual gasoline quantity, and determining gasoline quantity surge points based on the information comprises:

for each OBD device, calculating a gasoline quantity surge degree value corresponding to the each OBD device based on the residual gasoline quantity uploaded by the each OBD device; determining that the current OBD device is at a gasoline quantity surge point in response to determining that the calculated gasoline quantity surge degree value is higher than or equal to a first set threshold and the vehicle speed uploaded by the current OBD device is smaller than or equal to a second set threshold;

wherein calculating the gasoline quantity surge degree value includes:

collecting the residual gasoline quantities at every second within the set time;

selecting the maximum value among the residual gasoline quantities; and determining the gasoline quantity surge degree value based on the maximum value of the residual gasoline quantities.

10. The non-volatile computer storage medium according to claim 9, wherein the information further comprises a vehicle speed.

11. The non-volatile computer storage medium according to claim 9, wherein a length of the geo HASH character string is 7.

* * * * *